Figure 1:
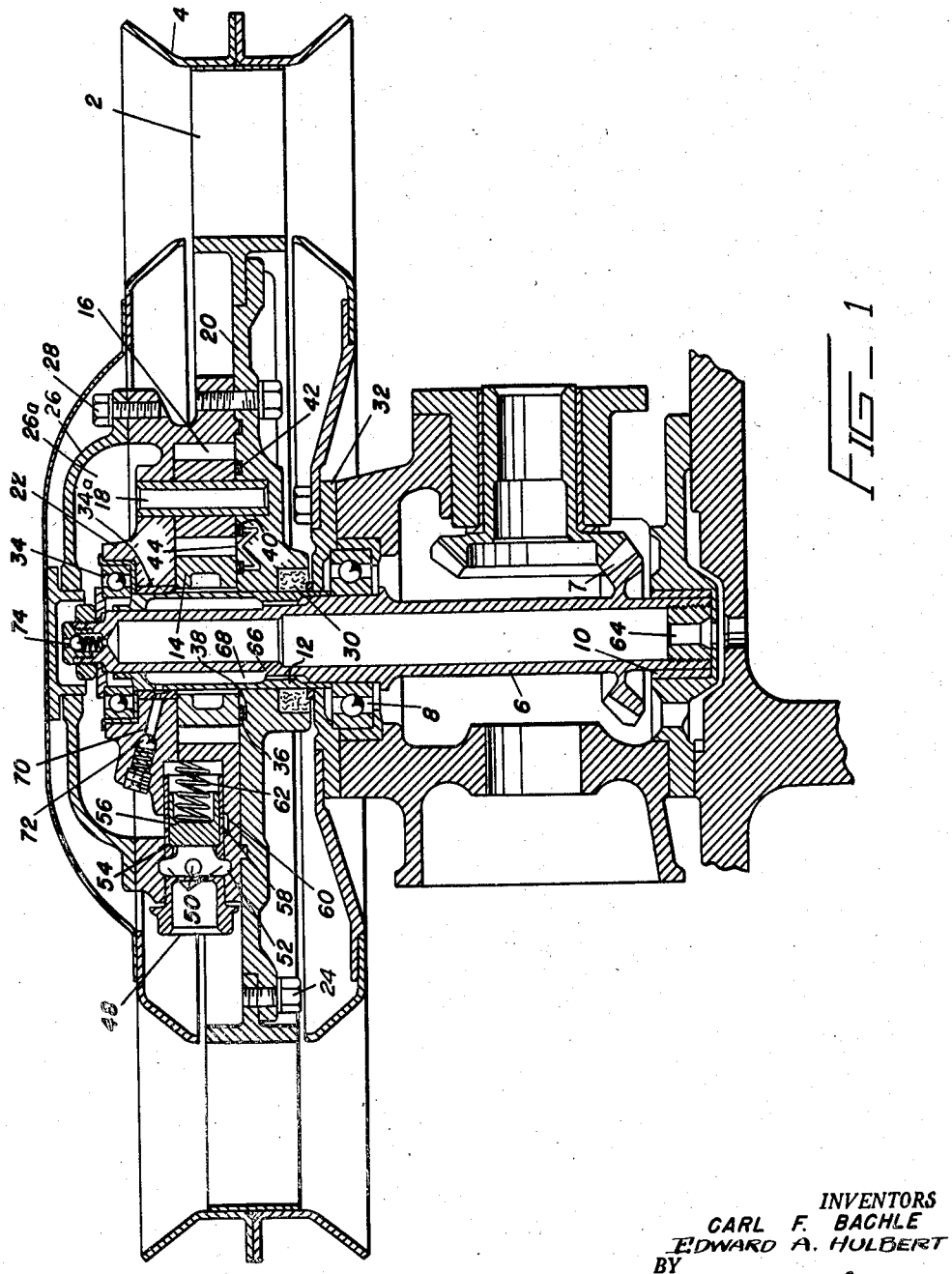

INVENTORS
CARL F. BACHLE
EDWARD A. HULBERT
BY

ATTORNEYS.

United States Patent Office 2,913,083
Patented Nov. 17, 1959

2,913,083

HYDRAULIC FAN DRIVES

Carl F. Bachle and Edward A. Hulbert, Grosse Pointe, Mich., assignors to Continental Motors Corporation, Detroit, Mich., a corporation of Virginia Continuation of abandoned application Serial No. 35,336, June 26, 1948. This application May 18, 1954, Serial No. 430,526

2 Claims. (Cl. 192—61)

This invention relates to a power transmitting mechanism, especially to a drive means for a blower or pump which is likely to be overloaded.

Some types of vehicles, especially certain military vehicles, are designed to ford streams. If such an automotive vehicle should be submerged sufficiently to bring the engine cooling fan or blower under water, the resultant increase in load on the fan might cause injury to the drive mechanism.

It is therefore desirable to provide for such vehicles a fan drive which will yield instead of break down when it is overloaded for one reason or other.

It is an object of this invention to provide power transmitting mechanism which will transmit a predetermined torque for normal operating conditions, but which has sufficient flexibility to yield without failure of any of the parts which the torque exceeds a predetermined maximum. This and other objects are accomplished in a drive which includes a fluid gear pump and a valve arranged to impede flow of fluid from the pump.

Figure 2:
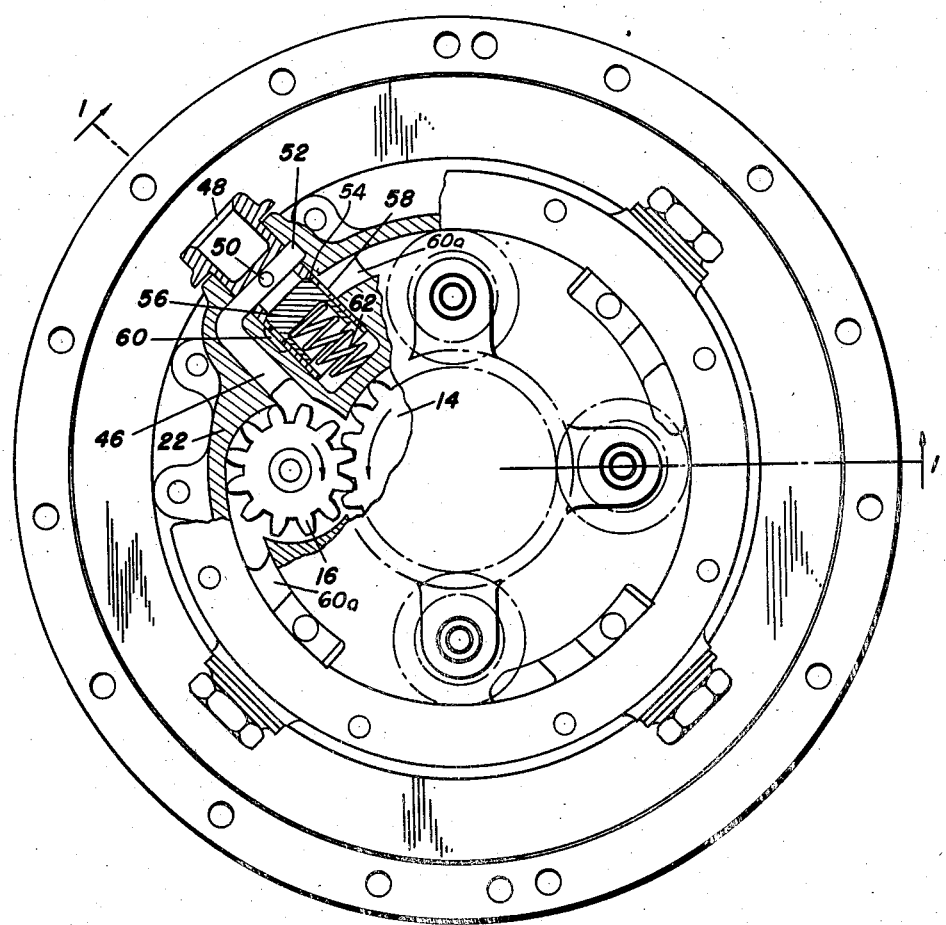

In the drawings:

Fig. 1 is a view in section through a power transmitting mechanism made according to the invention; more specifically, Fig. 1 is a view in section on line 1—1 of Fig. 2; and Fig. 2 is a horizontal plan view with parts broken away and in section of the power transmitting mechanism.

A fan or blower 2 is mounted for rotation in housing 4. A hollow shaft 6 is connected to be driven by the engine through any suitable means such as the gear train 7. Shaft 6 is rotatable in bearings 8 and 10, and is splined to a drive sleeve 12. Sleeve 12 is in turn connected to drive a suitable fluid pumping instrumentality, such as a gear pump. The gear pump is connected to be driven through the sleeve by the shaft 6 which the shaft rotates relatively to the power utilizer, in this case the fan 2. In the embodiment shown, a gear pump is shown, but obviously other types of pumps may be employed, if so desired.

The gear pump, as here shown, comprises a sun gear 14 splined to the sleeve 12 to be driven thereby, and a plurality of planet gears 16 meshing with the sun gear 14 and mounted on the fan 2 by means of stub shafts 18 are carried by the spider 20, to which the fan blades are secured to the spider 20 by any suitable means, such as studs 24. A cover 26 is secured to the housing by any satisfactory fastening means such as bolts 28.

A conventional suitable oil seal 30 is provided between the spider 20 and the bearing plate 32, and an antifriction thrust bearing 34 and other plain bearings 34a are provided to permit rotation of the shaft and sleeve assembly relatively to the pump housing 22. A sealing ring 36 is provided in a groove 38 beneath the sun gear, and a second sealing ring 40 is provided in groove 42 under each planet gear 16. Grooves 38 and 42 are supplied with fluid under pressure by means of the Y shaped passage 44 which communicates with the high pressure side of the gear pump as is best seen in Fig. 1.

A fluid conduit 46 is provided in the pump housing 22 and is arranged to receive fluid under pressure from the gear pump, as is best seen in Fig. 2. A valve is disposed in conduit 46 in such a manner as to impede the passage of fluid through the conduit. More specifically, a valve body 48 is provided in the conduit. A plurality of circumferentially spaced holes 50 in the valve body communicate with an annular recess 52 in the pump housing 22 and provide passage for the oil from the annular recess 52 to the interior of the valve body.

A valve seat 54 in the valve body cooperates with the closure member 56 to restrict or close the fluid conduit 46 to the passage of high pressure fluid. When the closure 56 is in its open position, fluid may pass outward through holes 58 to annular recess 60, whence the fluid thus released passes into the space occupied by the gear pump housing and again becomes available to the suction side of the pump through passage 60a.

As is best seen in Fig. 2, the axis of movement of the closure member 56 is substantially radial, and the valve seat and closure are so arranged that radial outward movement of the closure brings it into firm contact with the valve seat 54 and blocks the conduit 46 to further passage of high pressure fluid. Thus the closure 56 is arranged to be biased toward valve closing position by centrifugal force derived from rotation of the fan 2 and housing 22. A spring 62 aids centrifugal force in biasing the closure toward the valve closed position.

In order that there may always be fluid in the gear pump space available to the suction side of the gear pump, the shaft 6 is hollow, as has been pointed out above, and provides thus a passage for additional fluid. Fluid passes upward through plug 64 into the interior of the shaft 6, and passes through one or more holes 66 in the shaft into the annular space 68 between the shaft and the sleeve. A passage 70 communicates with the annular space 68 and is provided with a ball check valve 72 through which fluid may pass outwardly to the space 26a as through passage 60a and thence to the gear pump. Thus any loss of fluid from the chamber or space 26a available for the intake side of the pump is replenished through valve 72.

In the event that the fan 2 is stalled for long periods of time, fluid pressure in the space above the gear pump may build up to an excessive value. To prevent this, a ball check valve 74 is provided in the end of shaft 6 to relieve excessive pressure by communicating the gear pump space to the interior of shaft 6 and to permit fluid to flow from that space into the hollow shaft.

For normal operation, the torque required to drive the fan 2 is not great enough to provide more than a nominal amount of slip, or relative rotation, between the fan and shaft 6, and the closure 56 of the valve is maintained in the closed or nearly closed position by spring 62 and centrifugal force.

If the fan is suddenly immersed in a much denser fluid, such as water, or if the torque suddenly increases for any reason, the fluid pressure generated becomes enough to overcome the force of spring 62 and centrifugal force, and the closure 56 is unseated to permit the passage of high pressure fluid through the conduit 46. If the fan 2 is completely stalled, there is of course no longer any centrifugal force to bias the valve closure 56 into its seated position, and under those circumstances, the only force tending to move the valve closure toward its seated position will be the force of spring 62.

As soon as the excessive resistance to fan rotation has been removed, spring 62 is enabled to move closure 56 against the valve seat, and the fan again begins to rotate.

The hollow shaft 6, the fluid passage 70 and the ball check valve 72 assure that there will always be fluid available to the suction side of the gear pump. The ball check valve 74 assures that no excessive pressure will be allowed to build up on the low pressure side of the gear pump.

The practical application of the present invention is the mounting of this fan driving mechanism in a vehicle. The fan is driven from the engine crankshaft through a clutch mechanism as described above.

The vehicle, operating under normal conditions, drives the fan 2 because there is little resistance to the rotation of the driven element, the engine cooling fan. The vehicle now attempts to ford a stream, and the fan becomes immersed in water at least a sufficient amount to apply considerable resistance to fan rotation. The fan slows down and there is at once a relative rotation between the driving and driven elements causing the gear pump to operate and apply fluid pressure to the valve closure 56 to declutch the driving and driven elements. The fan can now stand still. But as soon as the vehicle leaves the stream and the fan is lifted out of the water, the spring 62 applies some initial movement to the valve closure 56 to close off the fluid outlet and thus the fan and drive is again positively clutched together.

The declutching mechanism is actuated in response to a resistance applied directly to the driven element (the fan). More particularly, when the driving and driven elements are clutched together, the fluid pump is inoperative. Centrifugal forces lock the gear 16 against relative rotation with respect to gear 14 and there is no pumping of fluid. Since gear 16 is carried by the driven element or fan, it is only by slowing down the fan that we obtain relative rotation of gears 14 and 16, resulting in the pumping of fluid (oil in this case) and the pressure of this oil is utilized to effect a positive declutching of the fan with the drive shaft. As long as there is such resistance present to retard the rotation of the fan, the fluid pump or broadly the clutching means, is actuated to declutch the fan and drive shaft.

This application is a continuation of applicants' copending application Serial No. 35,336, filed June 26, 1948, now abandoned.

We claim:

1. In a power transmitting mechanism, a driven element, a driving element, and means associated with said driving and driven elements and having automatically operated clutching and de-clutching mechanism comprising a centrifugally actuated member carried by the driven element and operable by the centrifugal force resulting from rotation of the driven element to effect clutching of a driving and driven elements, and spring means initially loading said member to urge the same radially outwardly in the same direction as urged by said centrifugal force, and means operable to overcome the force of said spring means upon the build-up of force resisting the rotation of the driven element to thereby actuate the member to de-clutch said driving and driven elements and to maintain said elements in a de-clutched relation as long as such force resisting said rotation of the driven element exists, said means operable when the forces resisting rotation of the driven element are removed to permit said spring means to again urge said member radially outwardly to begin such clutching of said elements and thereby effect full clutching of such elements by reason of the centrifugal forces on said member by reason of the rotation of said driven element, said mechanism comprising a gear pump having a sun gear connected to be driven by said driving element and a planet gear carried by said driven element, a fluid conduit connected to receive fluid under pressure from the gear pump when operable because of the relative rotation of the driven element with respect to said driving element, and said member comprising a valve in the conduit constructed and arranged to be biased towards its closed position by centrifugal force derived from rotation of the driven element, said spring means aforesaid acting on said valve, said valve when closed acting to impede fluid flow in said conduit and serving to lock said driven element to said driving element into direct drive relation, a second valve arranged to admit fluid to the system to replenish any losses of fluid, and a release valve associated with said system and communicating with the intake side of said gear pump to relieve excessive pressure built up in said system.

2. In a power transmitting mechanism for an internal combustion engine, a driven element, a driving element adapted to be driven by said engine, and a clutching means associated with said driving and driven elements, said clutching means comprising an actuated member carried solely by the driven element, said member being constructed and arranged to be actuated predominently by centrifugal force resulting from rotation of the driven element and to effect variable clutching of said driving and driven elements to a degree proportional to the aforesaid centrifugal force, spring means initially loading said member and resiliently urging same radially outwardly in the same direction as urged by centrifugal force to initiate the aforesaid clutching, and means operable to overcome the force of said spring means, and centrifugal force upon the build-up of force resisting rotation of said driven element and to actuate said member to positively effect de-clutching of said driving and driven elements and to maintain same in a de-clutched relation throughout the existence of the aforesaid resisting force to permit substantially unrestricted operation of said driving element, said last mentioned means operable only upon cessation of the aforesaid resisting force to permit said spring means to again urge said member radially outwardly to initiate clutching of said elements and rotation of said driven element, the increasing speed of rotation of said driven element operable to increase centrifugal force actuating said member to effect fully clutching of said driving and driven elements, said last mentioned means comprising a gear pump having a sun gear connected to be driven by said driving element and a planet gear carried by said driven element, a fluid conduit connected to receive fluid under pressure from the gear pump when operable because of relative rotation of said driven element with respect to said driving element upon build-up of the aforesaid rotation resisting force, said actuated member comprising a valve disposed in said conduit and constructed and arranged to be biased toward a closed position predominently by centrifugal force derived from rotation of said driven element, said valve when so closed being operable to impede fluid flow through said conduit and to restrict pumping operation of said gears to lock said driven element to said driving element in direct driving relation, the aforesaid spring means acting on said valve.

References Cited in the file of this patent

UNITED STATES PATENTS

| | | |
|---|---|---|
| 1,396,151 | Wheeler | Nov. 8, 1921 |
| 1,688,852 | Christie | Oct. 23, 1928 |
| 2,157,574 | Siesel | May 9, 1939 |
| 2,174,344 | Sinderson | Sept. 26, 1939 |
| 2,262,626 | Thorne | Nov. 11, 1941 |
| 2,311,237 | Loveday | Feb. 16, 1943 |
| 2,371,227 | Dodge | Mar. 13, 1945 |
| 2,377,350 | Marsh | June 5, 1945 |
| 2,418,625 | Cornelius | Apr. 8, 1947 |
| 2,484,015 | Cochran | Oct. 11, 1949 |
| 2,526,175 | Van Alstyne et al. | Oct. 17, 1950 |

FOREIGN PATENTS

| | | |
|---|---|---|
| 76,193 | Sweden | Oct. 27, 1930 |